United States Patent
Wang et al.

(10) Patent No.: US 10,495,467 B2
(45) Date of Patent: Dec. 3, 2019

(54) POSITIONING WITH INTERLEAVED VLC SIGNALS

(71) Applicant: QUALCOMM Incorporated, San Diego, CA (US)

(72) Inventors: Hua Wang, Basking Ridge, NJ (US); Kenneth Vavreck, Bridgewater, NJ (US); Jie Zheng, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 15/663,605

(22) Filed: Jul. 28, 2017

(65) Prior Publication Data
US 2019/0033079 A1    Jan. 31, 2019

(51) Int. Cl.
| | | |
|---|---|---|
| G08B 1/08 | (2006.01) | |
| H05B 33/00 | (2006.01) | |
| H05B 37/00 | (2006.01) | |
| H04B 1/00 | (2006.01) | |
| G01S 1/00 | (2006.01) | |
| G01C 21/20 | (2006.01) | |
| H04B 10/114 | (2013.01) | |
| H04B 10/116 | (2013.01) | |
| G01S 1/70 | (2006.01) | |

(52) U.S. Cl.
CPC ......... *G01C 21/206* (2013.01); *H04B 10/116* (2013.01); *H04B 10/1149* (2013.01); *G01S 1/70* (2013.01)

(58) Field of Classification Search
CPC .. G01C 21/206; H04B 10/1149; H04B 10/116
See application file for complete search history.

(56) References Cited

U.S. PATENT DOCUMENTS

| | | |
|---|---|---|
| 7,570,246 B2 | 8/2009 | Maniam et al. |
| 8,334,901 B1 | 12/2012 | Ganick et al. |
| 9,600,983 B1 | 3/2017 | Lydecker et al. |
| (Continued) | | |

FOREIGN PATENT DOCUMENTS

WO    2017042093 A1    3/2017

OTHER PUBLICATIONS

International Search Report and Written Opinion—PCT/US2018/039404—ISA/EPO—dated Oc. 9, 2018.

*Primary Examiner* — Adam D Tissot
(74) *Attorney, Agent, or Firm* — Hunter Clark PLLC; Robert A. Reid

(57) ABSTRACT

Techniques for determining a position of a mobile device using visible light communication signals are provided. An example device includes memory and a processor configured to in response to a determination that at least one first image of a plurality of images stored in the memory is of a modulated light signal transmitted by a light source and comprising coded information, determine a spatial location of a reference point of the light source based on the coded information, in response to a determination that at least one second image of the plurality of images is of an unmodulated light signal emanating from the light source, determine an image location of the reference point of the light source in the at least one second image, and determine a position of the mobile wireless communication device based on the image location of the reference point and the spatial location of the reference point.

22 Claims, 8 Drawing Sheets

(56) References Cited

U.S. PATENT DOCUMENTS

| | | | |
|---|---|---|---|
| 2014/0086587 A1* | 3/2014 | Roberts | H04B 10/116 398/115 |
| 2014/0093249 A1 | 4/2014 | Roberts et al. | |
| 2014/0301737 A1 | 10/2014 | Guo et al. | |
| 2015/0280820 A1 | 10/2015 | Breuer et al. | |
| 2016/0154088 A1 | 6/2016 | Holtman et al. | |
| 2016/0249164 A1 | 8/2016 | Jovicic | |
| 2016/0323035 A1 | 11/2016 | Jovicic et al. | |

* cited by examiner

BEST AVAILABLE IMAGE

POSITIONING WITH INTERLEAVED VLC SIGNALS

BACKGROUND

Determination of the orientation of a mobile device in indoor environments may be useful in a number of applications. For example, the orientation of a mobile device may be needed to navigate mobile phone users in office/commercial environments, to enable customers to find items in a supermarket or retail outlet, for coupon issuance and redemption, and for customer service and accountability. However, achieving precise orientation estimates in indoor venues is a challenging task. Mobile devices typically estimate their orientation using a compass that is built in to the mobile devices. Such orientation estimates, however, are often highly inaccurate due to the presence of metallic objects inside walls, door frames, and furniture in most indoor venues.

Determination of the position of a mobile device in indoor environments may also be useful. For example, a position of a mobile device may be used for providing directions to a point of interest, providing information regarding products and/or services nearby, or providing other location-based services. To this end, heatmaps indicating the signal strength corresponding to one or more Wi-Fi access points may be used in conjunction with received signals to determine a position of a mobile device.

SUMMARY

An example of a mobile wireless communication device according to with the disclosure includes memory and a processor, communicatively coupled to the memory and configured to in response to a determination that at least one first image of a plurality of images stored in the memory is of a modulated light signal transmitted by a light source and comprising coded information, determine a spatial location of a reference point of the light source based on the coded information, in response to a determination that at least one second image of the plurality of images is of an unmodulated light signal emanating from the light source, determine an image location of the reference point of the light source in the at least one second image, and determine a position of the mobile wireless communication device based on the image location of the reference point and the spatial location of the reference point.

Implementations of such a mobile wireless communication device may include one or more of the following features. The processor may be configured to analyze each of a plurality of images for a detectable stripe within a region corresponding to the light source to make the determination that the at least one first image is of the modulated light signal and the determination that the at least one second image is of the unmodulated light signal. A camera comprising a rolling shutter and configured to capture the plurality of images, such that the processor is configured to identify, as the at least one second image, each of the plurality of images in which the light source is without a detectable stripe across the light source. To determine the spatial location of the reference point the processor may be configured to determine an identity of the light source based on the coded information, and find the spatial location of the reference point based on the identity of the light source and an association of the identity of the light source and the spatial location of the reference point. The processor may be configured to determine the image location of the reference point by analyzing only the at least one second image. The processor may be configured to determine the position of the mobile wireless communication device further based, at least in part, on an orientation of the mobile wireless communication device.

An example of a method according to the disclosure includes determining a spatial location of a reference point of a light source based on coded information in a modulated light signal from the light source in response to a determination that at least one first image is of the modulated light signal from the light source, determining an image location of the reference point of the light source in at least one second image in response to a determination that the at least one second image is of an unmodulated light signal from the light source, and determining a position of a mobile wireless communication device based on the image location of the reference point and the spatial location of the reference point.

Implementations of such a method may include one or more of the following features. The method may further include capturing a plurality of images including the at least one first image and the at least one second image, and making the determination that the at least one first image is of the modulated light signal from the light source and the determination that the at least one second image is of the unmodulated light signal from the light source by analyzing each of the plurality of images for a detectable stripe within regions of the plurality of images corresponding to the light source. Making the determination that the at least one second image is of the unmodulated light signal from the light source may include identifying, as the at least one second image, each of the plurality of images in which the light source is without the detectable stripe within the region of light corresponding to the light source. Determining the spatial location of the reference point may include determining an identity of the light source from the coded information, and finding the spatial location of the reference point based on the identity of the light source and an association of the identity of the light source and the spatial location of the reference point. Determining the image location of the reference point may include analyzing only the at least one second image. Determining the position of the mobile wireless communication device may be further based on an orientation of the mobile wireless communication device.

An example of a mobile wireless communication device according to the disclosure may include means for storing a plurality of images, means for determining a spatial location of a reference point of a light source based on coded information in a modulated light signal from the light source in response to a determination that at least one first image, of the plurality of images, is of the modulated light signal from the light source, means for determining an image location of the reference point of the light source in at least one second image, of the plurality of images, in response to a determination that the at least one second image is of an unmodulated light signal from the light source, and means for determining a position of the mobile wireless communication device based on the image location of the reference point and the spatial location of the reference point.

Implementations of such a mobile wireless communication device may include one or more of the following features. Means for capturing the plurality of images, and means for making the determination that the at least one first image is of the modulated light signal from the light source and the determination that the at least one second image is of the unmodulated light signal from the light source by analyzing each of the plurality of images for a detectable stripe within regions of the plurality of images corresponding to the light source. The means for making the determination that the at least one second image is of the unmodulated light signal from the light source may include means for identifying, as the at least one second image, each of the plurality of images in which the light source is without the detectable stripe within the region of light corresponding to the light source. The means for determining the spatial location of the reference point may include means for determining an identity of the light source from the coded information, and means for finding the spatial location of the reference point based on the identity of the light source and an association of the identity of the light source and the spatial location of the reference point. The means for determining the image location of the reference point may be configured to analyze only the at least one second image of the plurality of images. The means for determining the position of the mobile wireless communication device are for determining the position of the mobile wireless communication device further based on an orientation of the mobile wireless communication device.

An example of a non-transitory, processor-readable storage medium according to the disclosure includes processor-readable instructions configured to cause a processor to determine a spatial location of a reference point of a light source based on coded information in a modulated light signal from the light source in response to a determination that at least one first image is of the modulated light signal from the light source, determine an image location of reference point of the light source in at least one second image in response to a determination that the at least one second image is of an unmodulated light signal from the light source, and determine a position of a mobile wireless communication device based on the image location of the reference point and the spatial location of the reference point.

Implementations of such a non-transitory, processor-readable storage medium may include one or more of the following features. Instructions configured to cause the processor to analyze each of a plurality of images for a detectable stripe within a region corresponding to the light source to make the determination that the at least one first image is of the modulated light signal from the light source and the determination that the at least one second image is of the unmodulated light signal from the light source. The instructions configured to cause the processor to make the determination that the at least one second image is of the unmodulated light signal from the light source may include instructions configured to cause the processor to identify, as the at least one second image, each of the plurality of images in which the light source is without the detectable stripe within the region of light corresponding to the light source. The instructions configured to cause the processor to determine the location of the light source may include instructions configured to cause the processor to determine an identity of the light source from the coded information, and find the spatial location of the reference point based on the identity of the light source and an association of the identity of the light source and the spatial location of the reference point. The instructions configured to cause the processor to determine the image location of the reference point may be configured to cause the processor to analyze only the at least one second image. The instructions configured to cause the processor to determine the position of the mobile wireless communication device may be configured to cause the processor to determine the position of the mobile wireless communication device further based on an orientation of the mobile wireless communication device.

DETAILED DESCRIPTION

Techniques are discussed herein for determining a position of a mobile device using visible light communication signals. For example, multiple light sources each provides a visible light communication signal with interleaved modulated and unmodulated signals. The modulated signals convey information such as an identity of the light source. The unmodulated signals provide a consistent amplitude of light. A mobile device receives the visible light communication signal and distinguishes between the modulated signals and the unmodulated signals of the visible light communication signal. The mobile device determines identities of light sources from the modulated signals and locates reference features of the light sources from the unmodulated signals. The mobile device uses the identities of the light sources to obtain spatial locations of the reference features, and uses the spatial locations of the reference features, and one or more images of the light sources to determine a position of the mobile device. These techniques are examples only, and not exhaustive.

Items and/or techniques described herein may provide one or more of the following capabilities, as well as other capabilities not mentioned. Determined position accuracy of a mobile device from visible light communication signals may be improved, e.g., by 10 cm or more. Light fixture identities may be determined without compromising light fixture contour detection. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
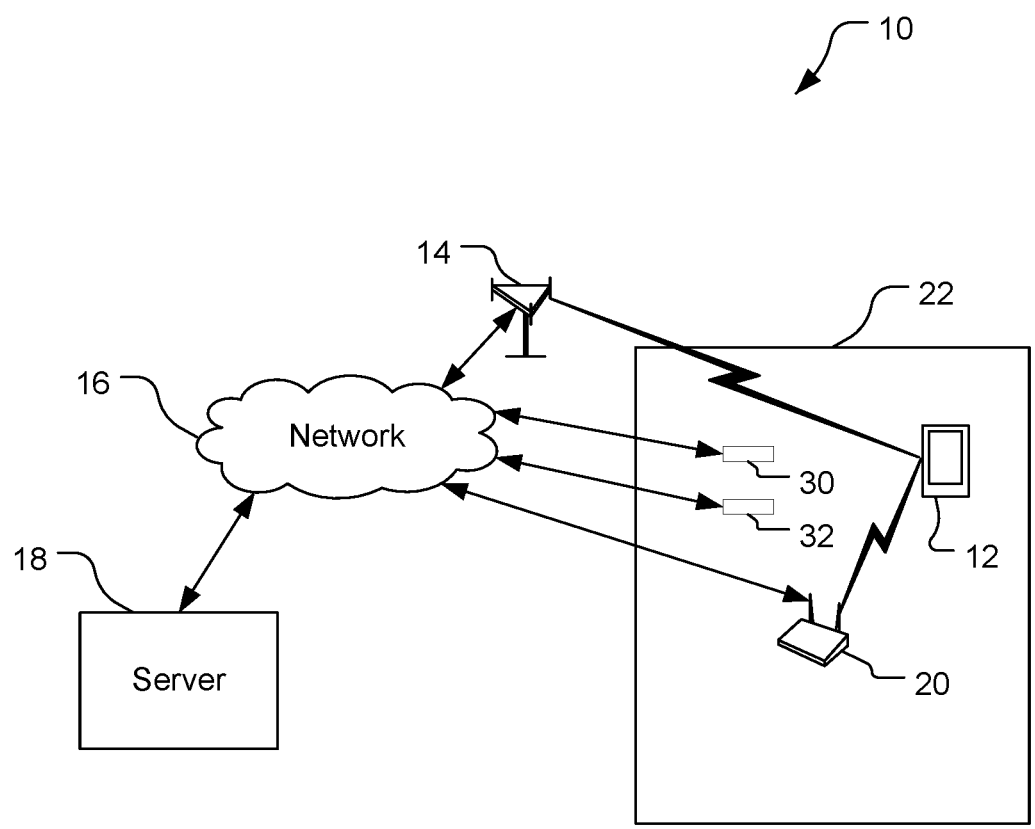
FIG. 1 is a simplified diagram of a communication system.

Referring to FIG. 1, a wireless communication system 10 includes a mobile device 12, a base transceiver station (BTS) 14, a network 16, a server 18, an access point (AP) 20, and indicators, here light sources or, simply, lights 30, 32 disposed in a building 22. The system 10 is a communication system in that the system 10 can at least send and receive communications. Although only one mobile device 12, one BTS 14, one network 16, one server 18, and one AP 20 are shown for simplicity, more than one of any of these entities, or any combination of these entities, may be used. Also for simplicity, only the single mobile device 12 is discussed below. The mobile device 12 is a mobile wireless communication device capable of communicating wirelessly with one or more devices including the AP 20 and the BTS 14. As shown, the mobile device 12 is a smartphone, although other types of mobile devices (e.g., personal digital assistants (PDAs), netbooks, notebook computers, tablet computers), either presently known or developed in the future, may be used. The lights 30, 32 may be connected to the network 16, as shown, such that the outputs of the lights 30, 32 may be controlled. The server 18 may communicate with the mobile device 12 via the BTS 14 and/or the AP 20.

The BTS 14 and/or the AP 20 can wirelessly communicate with the mobile device 12 via antennas. The BTS 14 may also be referred to as an access node (AN), a Node B, an evolved Node B or eNodeB (eNB), etc. The BTS 14 is configured to communicate wirelessly with the mobile device 12 under the control of the server 18 (via the network 16). The BTS 14 and the AP 20 are preferably connected to and communicate with the network 16 through wired connections, although the BTS 14 and/or the AP 20 may also or alternatively communicate with the network 16 through a wireless connection, or a combination of one or more wired connections and one or more wireless connections.

Figure 2:
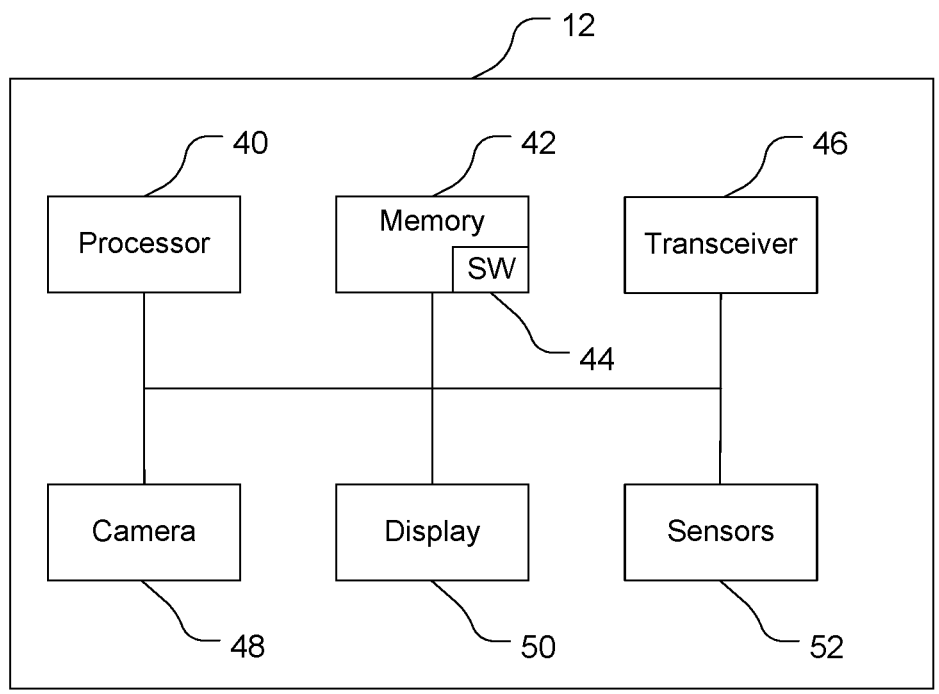
FIG. 2 is a block diagram of components of an example of a mobile device shown in FIG. 1.

Referring also to FIG. 2, the mobile device 12 comprises a computer system including a processor 40, a memory 42 including software 44, a transceiver 46, a camera 48, a display 50, and sensors 52. The transceiver 46 is configured to communicate bi-directionally with the BTS 14 and the AP 20. The processor 40 is preferably an intelligent hardware device, e.g., a central processing unit (CPU) such as those made or designed by QUALCOMM®, ARM®, Intel® Corporation, or AMD®, a microcontroller, an application specific integrated circuit (ASIC), etc. The processor 40 could comprise multiple separate physical entities that can be distributed in the mobile device 12. The memory 42 includes random access memory (RAM) and read-only memory (ROM). The memory 42 stores the software 44 which is computer-readable, computer-executable software code containing instructions that are configured to, when performed, cause the processor 40 to perform various functions described herein. The software 44 may not be directly executable by the processor 40 but configured to cause the processor 40, e.g., when compiled and executed, to perform the functions. Whether needing compiling or not, the software 44 contains the instructions to cause the processor 40 to perform the functions.

The camera 48 and the display 50 are configured to capture and display images. The camera 48 may be a rolling-shutter camera in that the camera 48 may capture one or more rows of pixels of an image at a time, followed by one or more further rows of pixels until all the rows of pixels have been captured. Thus, different rows of pixels of an image will be captured at different times. The camera 48 can capture images, e.g., of light sources, and provide information about the images to the display 50. The display 50 is configured to use the information about the images to display the images to a user of the mobile device 12. The camera 48 may be configured to capture images with a low resolution and/or black-and-white images instead of full color images, for example being a dedicated low-resolution light sensor or low-resolution camera that may not be used for photographs. For example, the camera 48 may be configured to capture images with a resolution of no more than 400,000 pixels. The camera 48 may also or alternatively be configured to capture images, e.g., black-and-white images, with a low exposure, e.g., using an exposure duration less than 100 microseconds. The processor 40 (e.g., per the software 44) may be configured to cause the camera 48 to capture black-and-white images, e.g., with no more than 400,000 pixels, and/or to capture images with a low exposure. The camera 48 may include multiple cameras, e.g., a forward-facing camera and a rear-facing camera.

The sensors 52 include one or more orientation sensors configured to measure and provide indications of roll and pitch of the mobile device 12, and one or more field sensors configured to measure field vector values. To determine the roll and pitch of the mobile device 12, the sensors 52 include a six-axis gyroscope and an accelerometer. The sensors 52 may be considered to have two orientation sensors (e.g., a first (roll) orientation sensor to obtain an indication of roll and a separate second (pitch) orientation sensor to obtain an indication of pitch) or one sensor (e.g., the first and second orientation sensors being a single sensor, or parts of a single sensor).

Figure 3:
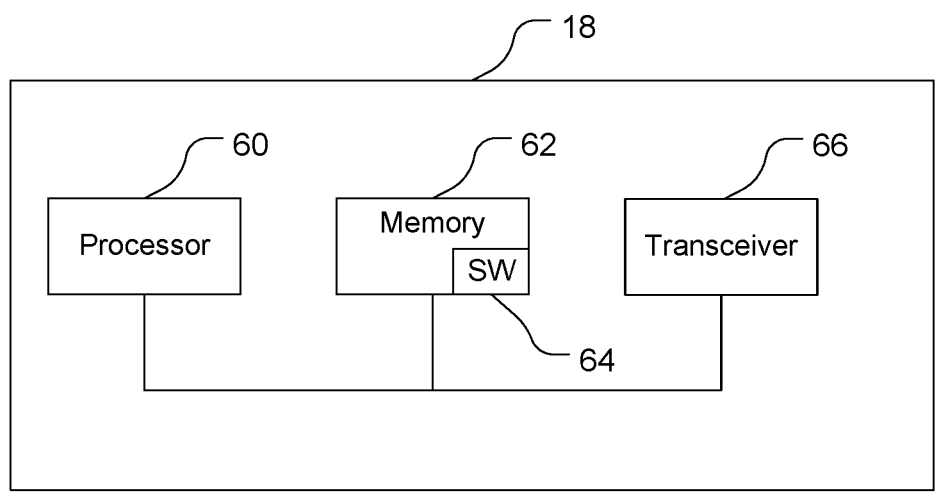
FIG. 3 is a block diagram of components of an example of a server shown in FIG. 1.

Referring to FIG. 3, with further reference to FIG. 1, the server 18 comprises a computer system including a processor 60, a memory 62 including software 64, and a transceiver 66. The transceiver 66 is configured to communicate bi-directionally with the network 16. The transceiver 66 may be configured to communicate with the network 16 wirelessly and/or through one or more wired connections, e.g., with the transceiver 66 being a wired network interface. The processor 60 is preferably an intelligent hardware device, e.g., a central processing unit (CPU) such as those made or designed by QUALCOMM®, Intel® Corporation, or AMD®, a microcontroller, an application specific integrated circuit (ASIC), etc. The processor 60 could comprise multiple separate physical entities that can be distributed in the server 18. The memory 62 includes random access memory (RAM) and read-only memory (ROM) and preferably long-term memory such as a hard disk drive. The memory 62 stores the software 64 which is computer-readable, computer-executable software code containing instructions that are configured to, when performed, cause the processor 60 to perform various functions described herein. The software 64 may not be directly executable by the processor 60 but configured to cause the processor 60, e.g., when compiled and executed, to perform the functions. Whether needing compiling or not, the software 64 contains the instructions to cause the processor 60 to perform the functions.

Figure 5:
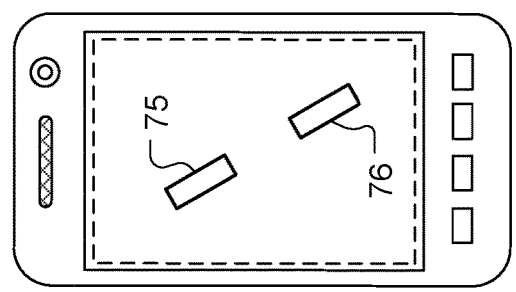
FIG. 5 is a top view of a mobile device shown in FIG. 4.
Figure 4:
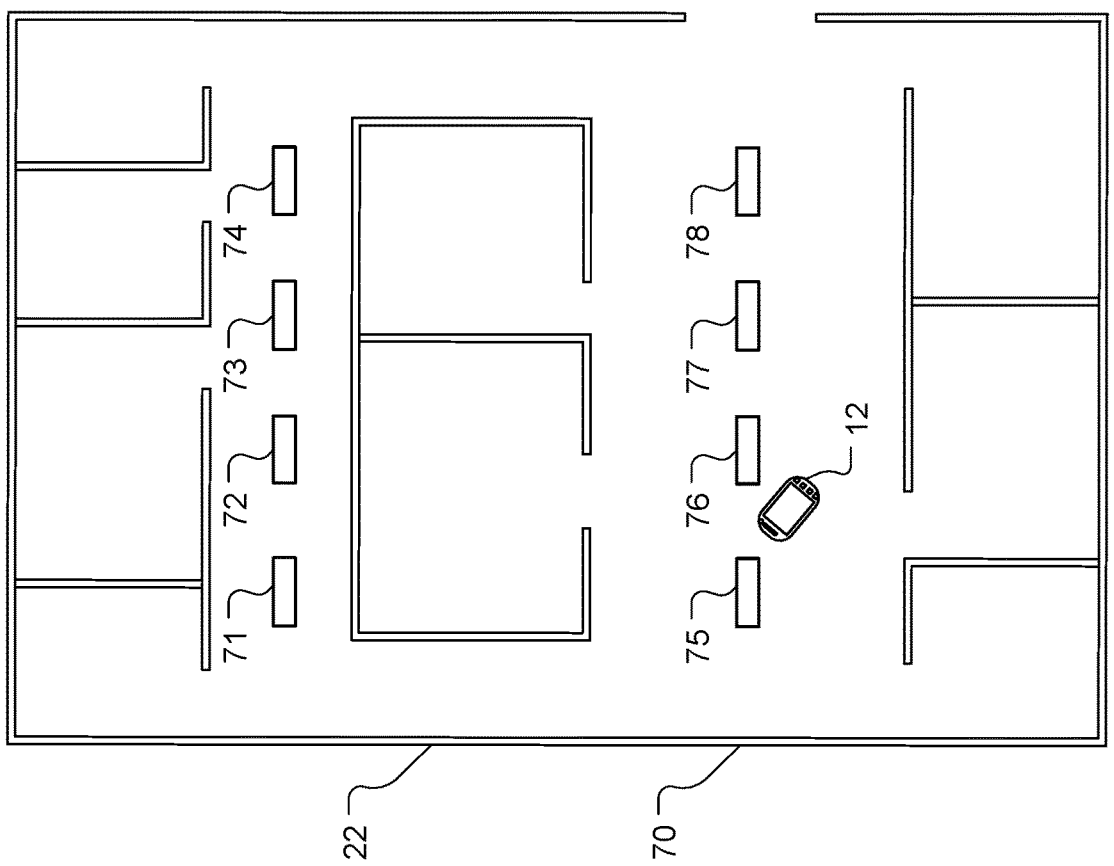
FIG. 4 is a top view of a floor of a building shown in FIG. 1.

Referring to FIGS. 4-5, with further reference to FIGS. 1-2, the mobile device 12 is disposed in a level or floor 70 of the building 22, with the floor including lights 71, 72, 73, 74, 75, 76, 77, 78. The mobile device 12 may, for example, be held by a user (not shown) who is stationary or moving on the floor 102. While there are eight of the lights 71-78 shown in FIG. 4, this is an example and more or fewer lights may be used. The lights 71-78 may include any of a variety of light-producing elements such as light-emitting diodes (LEDs). Each of the lights 71-78 may be configured to communicate information for identifying the corresponding light 71-78. As discussed herein, the mobile device 12 may be configured to use the information communicated by the lights 71-78 to determine a position of the mobile device 12, e.g., a position of the mobile device 12 in three-dimensional space relative to a reference axis (e.g., of the building 22 of the floor 70, etc.). For example, the mobile device 12 may capture an image of the lights 75-76 as shown in FIG. 5, identify reference points of the lights 75-76 from the image, determine image locations of the reference points (i.e., locations of the reference points within an image, e.g., relative to an image boundary such as a boundary of the display 50), and determine spatial locations of the reference points (i.e., two- or three-dimensional locations of the reference points relative to a reference axis such as the earth's center, the reference axis of the building 22, the floor 70, etc.) from stored information for the lights 75-76. The mobile device 12 may use the image locations of the reference points and the spatial locations of the reference points, and optionally an orientation of the mobile device 12, to determine vectors or lines connecting the mobile device 12 and the spatial locations of the reference points. The mobile device 12 may determine a vertex of the vectors or lines as the position of the mobile device 12.

The processor 40 may be configured to determine image locations of reference features by analyzing images. The processor 40 may be configured to find edges, corners, centers of shapes, etc. as reference features, e.g., by finding intersections of edges, centers of circular perimeters of lights, etc. The processor 40 may be configured to determine an image location of a reference feature in response to a determination that an image is of an unmodulated light signal.

Figure 6:
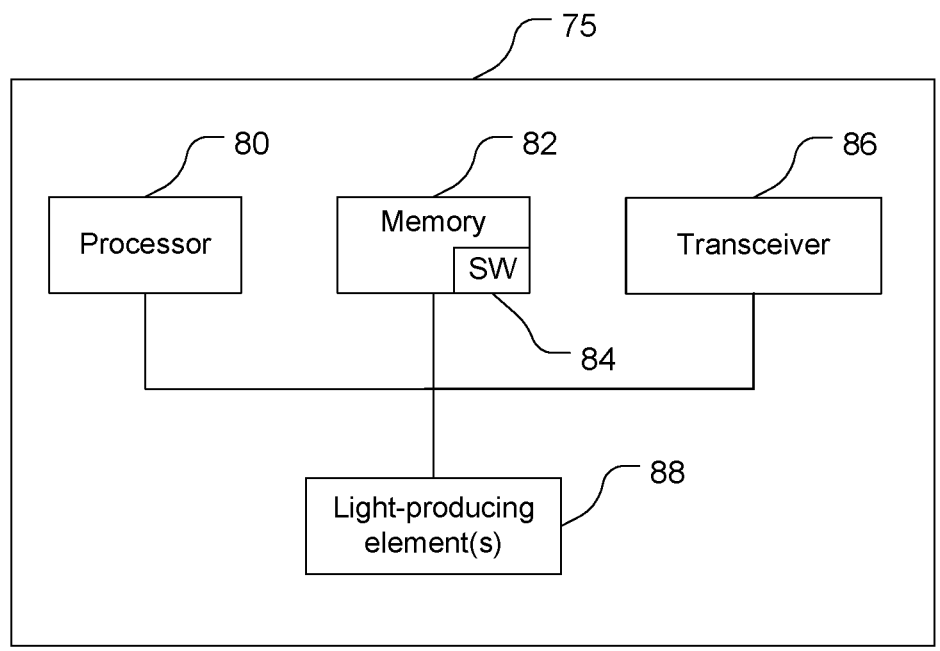
FIG. 6 is a block diagram of components of an example of a light shown in FIG. 4.

The lights 71-78 are configured to transmit visible light communication (VLC) signals. Each of the lights 71-78 contains one or more light-producing elements such as LEDs, and a modulator such as a processor (and associated software) configured to control the light-producing element(s) to provide a modulated light signal. For example, referring also to FIG. 6, the light 75 comprises a computer system including a processor 80, a memory 82 including software 84, a transceiver 86, and one or more light-producing elements 88. The transceiver 86 is configured to communicate bi-directionally with the network 16. The transceiver 86 may be configured to communicate with the network 16 wirelessly and/or through one or more wired connections, e.g., with the transceiver 86 being a wired network interface. The processor 80 is preferably an intelligent hardware device, e.g., a central processing unit (CPU) such as those made or designed by QUALCOMM®, ARM®, Intel® Corporation, or AMD®, a microcontroller, an application specific integrated circuit (ASIC), etc. The processor 80 could comprise multiple separate physical entities that can be distributed in the light 75. The memory 82 includes random access memory (RAM) and read-only memory (ROM) and preferably long-term memory such as a hard disk drive. The memory 82 stores the software 84 which is computer-readable, computer-executable software code containing instructions that are configured to, when performed, cause the processor 80 to perform various functions described herein. The software 84 may not be directly executable by the processor 80 but configured to cause the processor 80, e.g., when compiled and executed, to perform the functions. Whether needing compiling or not, the software 84 contains the instructions to cause the processor 80 to perform the functions. The light-producing element(s) 88 is(are) configured to produce light under the control of the processor 80 to provide VLC signals as discussed herein. The light 75 is used here as an example, but the other lights 71-74, 76-78 may be configured similarly.

The lights 71-78 are configured to convey information intentionally by frequency modulating VLC signals using the information to be conveyed. Each of the lights 71-78 may be configured to convey a respective VLC signal containing an identification of the light 71-78 sending the VLC signal. For example, the identification information transmitted by each of the lights 71-78 may be a 48-bit MAC address that is unique with respect to other lights, at least other lights within the building 22. Other types of identification information may be transmitted by the lights 71-78 with the identification information allowing for disambiguation of the light 71-78 located in a particular venue (e.g., a floor of an office building, supermarket, or shopping mall).

Figure 7:
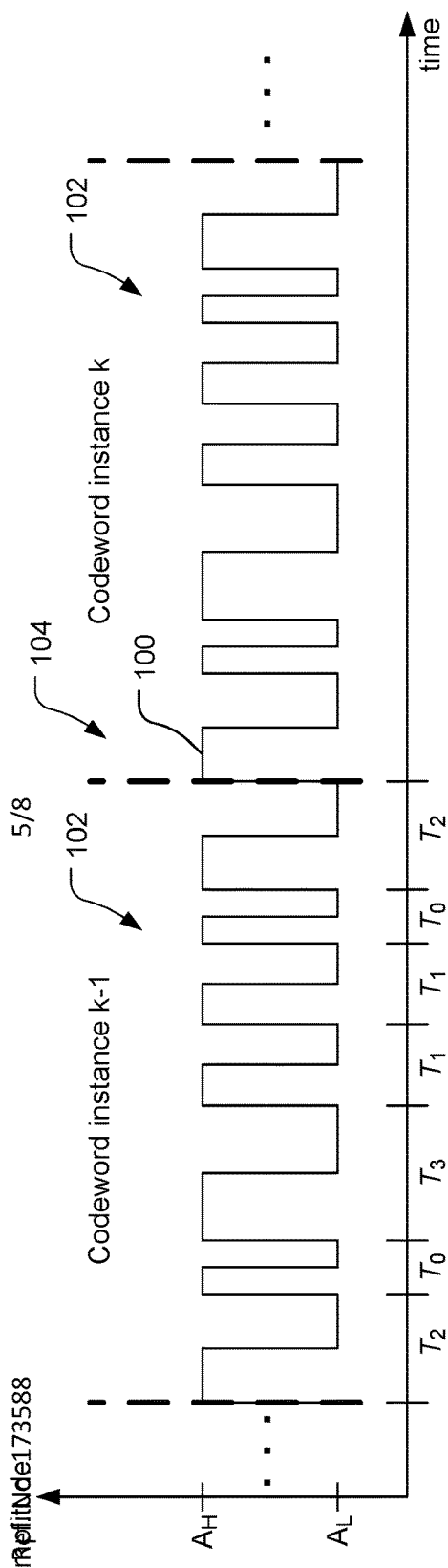
FIG. 7 is a timing diagram of a modulated visible light communication signal conveying codewords.
Figure 8:
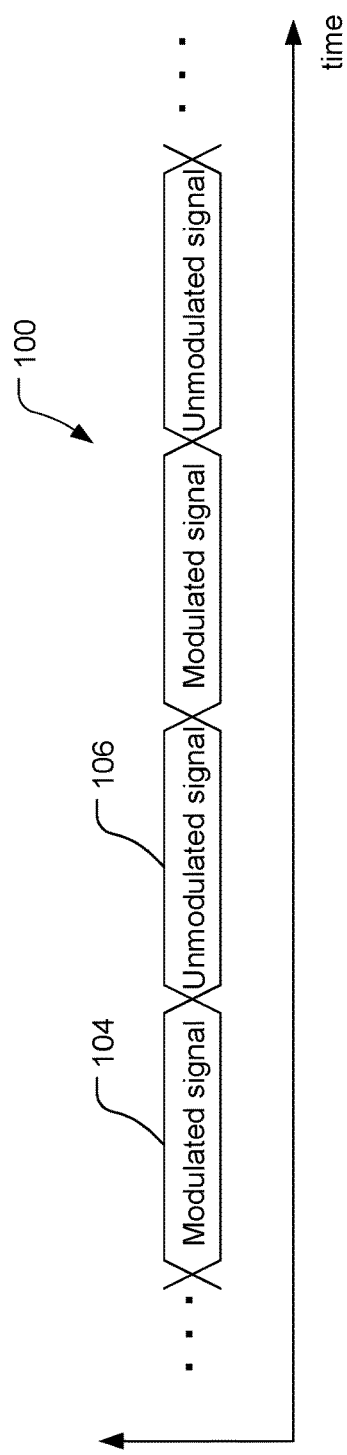
FIG. 8 is a timing diagram of interleaved modulated and unmodulated portions of a visible light communication signal.

Referring also to FIGS. 7-8, an example of a VLC signal 100, that could be conveyed by any of the lights 71-78, includes interleaved modulated signals 104 (e.g., modulated portions of the VLC signal 100) and unmodulated signals 106 (here, unmodulated portions of the VLC signal 100). Here, a codeword comprises a combination of symbols 0, 1, 2, or 3, with each of the symbols 0, 1, 2, 3 having a corresponding different duration time $T_0$, $T_1$, $T_2$, $T_3$, but all with the on amplitude. In this example, the signal 100 is modulated with a codeword 102 of [2 0, 3, 1, 1, 0, 2 ] to produce the modulated signals 104. The modulated signals 104 each include multiple instances of the codeword 102, preferably consecutively arranged. Each of the modulated signals 104 preferably has a duration that will enable a receiving device to capture sufficient images of the VLC signal 100 to decode the codeword 102. For example, a codeword may be between 2 ms and 4 ms long, the mobile device 12 (or other device decoding the codeword) may use, for example, 10 images of the light to decode the codeword, and the mobile device 12 may capture about 30 images per second. Thus, the modulated signal 104 may be at least a third of a second, e.g., about 0.5 seconds, long and include 125-250 instances of the codeword, although other durations and lengths of codewords may be used.

The unmodulated signals 106 have a constant frequency and constant amplitude while the amplitude of the signal 100 in the modulated signals 104 varies between a high amplitude $A_H$ and a low amplitude $A_L$. The modulated signal 104 is at the high amplitude $A_H$ for the appropriate time duration $T_0$, $T_1$, $T_2$, $T_3$ corresponding to the appropriate symbol value. The high amplitude $A_H$ is of a level that the received VLC signal 100 will appear bright white in an image captured by the camera 48 of the mobile device 12. The low amplitude $A_L$ is of a level that the received VLC signal 100 will appear dim or even dark in an image captured by the camera 48 of the mobile device 12. The low amplitude $A_L$ may be zero, e.g., the entire light is off (e.g., multiple LEDs working in unison all being off). The amplitude of the unmodulated signals 106 may be of the high amplitude $A_H$ or another amplitude that allows the VLC signal 100 to appear bright white in an image.

Figure 9:
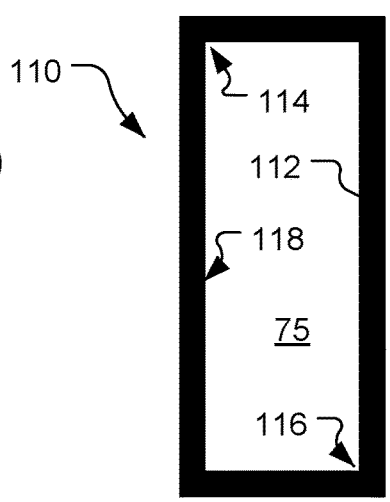
FIGS. 9-12 are images of a light transmitting an unmodulated portion or a modulated portion of a visible light communication signal.
Figure 10:
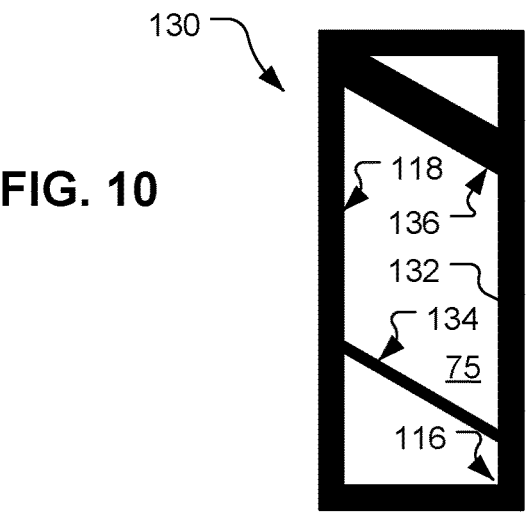
Figure 11:
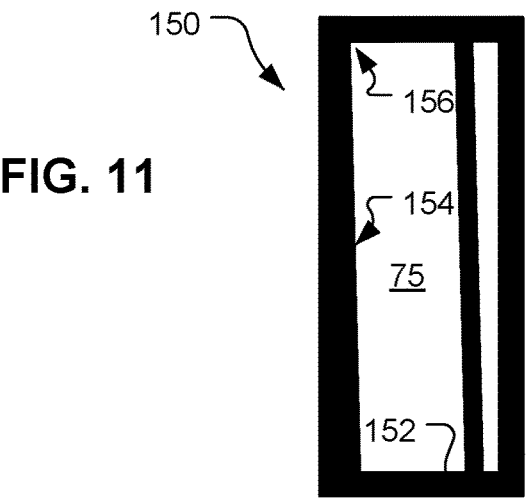

Referring also to FIGS. 9-11, the modulated signals 104 may result in boundary variations of images of the lights 71-78. As shown in FIG. 9, an image 110 including the light 75 captured by the camera 48 while the light 75 was transmitting the unmodulated signal 106 of the VLC signal 100 has a perimeter 112 of the light 75 that is continuous (unbroken), clearly defined, and corresponds to the actual perimeter of the light 75. Images 130, 150, both captured while the light 75 was transmitting the modulated signal 104 of the VLC signal 100, have perimeters 132, 152 of the light 75 that are discontinuous (broken) and/or do not correspond to the actual shape (contour) of the light 75.

The lights 71-78 each include one or more reference features that have known spatial locations and/or may be used to help identify one or more reference features with known spatial locations for use in determining a position of the mobile device 12. Here, the light 75 is rectangular and the perimeter 112 includes reference features 114, 116 at respective corners of the perimeter 112, and a reference edge 118. Other reference features may be used, e.g., a center of a circular light. Because the perimeter 112 is representative of the actual shape of the light 75 and is clearly defined, the processor 40 of the mobile device 12 (or the processor 60 of the server 18, or a processor of another device) may analyze the image 110 and locate the reference features 114, 116, 118 accurately. The processor 40 (or other device) may use known spatial locations of the reference features 114, 116, 118, image locations of the reference features 114, 116, 118, and, optionally, the orientation of the mobile device 12 to determine a position of the mobile device 12.

The perimeter 132 of the light 75 in the image 130 is discontinuous and does not correspond to the actual shape of the light 75. The image 130 contains low-modulated stripes 134, 136 (bands) where one or more rows of pixels were captured while the modulated signal 104 was at the low amplitude $A_L$. While the stripes 134, 136 are shown as being straight, the stripes 134, 136 may be non-straight, e.g., bent or curved, due to movement of the mobile device 12, for example. The shape of the light 75 may be discerned (e.g., inferred) from the image 130, but the clearly-visible portions of the image 130 do not make up the entire actual shape of the light 75. Further, the reference feature 114 shown in FIG. 9 is not visible in the image 130, and the reference edge 118 is not continuous, which may lead to an imprecise determination of one or more reference features of the light 75 in the image 130.

The perimeter 152 of the light 75 in the image 150 is also discontinuous and does not correspond to the actual shape of the light 75. Here, the shape and/or size of the light 75 may be difficult or impossible to discern from the image 150 in addition to the clearly-visible portions of the image 150 not making up the entire actual shape of the light 75. In the image 150, a dark stripe is at the left edge of the light 75 so that the reference edge 118 shown in FIG. 9 is not visible at all in the image 150. If an edge 154 of the image 150 is incorrectly determined to be the reference edge 118 of the light 75, then processor 40 (or other device) may incorrectly determine the position of the mobile device 12 based on the improper correlation of the image location of the edge 154 to image location of the reference edge 118. Further, the reference feature 114 shown in FIG. 9 is not visible in the image 150, thus leading to an inability to use the image location of the reference feature 114 to determine the position of the mobile device 12, or possibly an incorrect determination of the position of the mobile device 12 if a corner 156 of the light 75 in the image 150 is determined to be the corner (i.e., reference feature 114).

The processor 40 may be configured to determine whether an image of a light is of a modulated VLC signal or an unmodulated VLC signal and to use only images of lights of unmodulated VLC signals to locate reference features of the lights. To determine that light in an image is from an unmodulated light signal, the processor 40 may analyze an image of a light to determine whether the perimeter is continuous or discontinuous, e.g., whether there is a dark stripe through a light, and identify an image is of an modulated light signal if there is a dark stripe through a light in the image. As another example, the processor 40 may analyze signal amplitude variance across a frame or an image and conclude that the frame or image is of an unmodulated signal (or unmodulated signals) if the variance is below a threshold, and therefore identify the image as containing an unmodulated light signal. The processor 40 may be configured to analyze multiple images of a single light to determine that the images are of an unmodulated signal, e.g., by comparing the perimeters of the light in multiple images to guard against using an image where a single dark stripe is at an edge of the image. The processor 40 may be configured to use a single one of the multiple images of the unmodulated signal to locate the reference feature(s) of the light.

Figure 12:
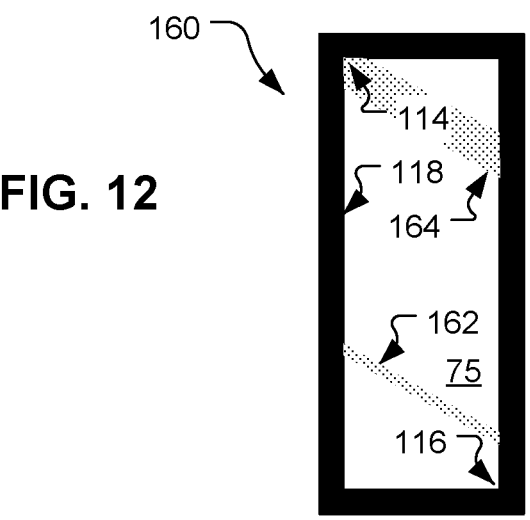

Also or alternatively, the processor 40 may be configured to use images of lights of modulated VLC signals to locate reference features of the lights if low-modulated stripes are visible. For example, while the low-modulated stripes 134, 136 in the image 130 are black, low-modulated stripes captured with the modulated signal 104 at the low amplitude $A_L$ may be somewhat visible depending upon the value of the low amplitude $A_L$, and possibly one or more other factors such as the distance from the light 75 to the mobile device 12. Referring also to FIG. 12, an image 160 including the light 75 has low-modulated stripes 162, 164 that are visible and thus the processor 40 may be able to locate the corner (i.e., reference feature 114) and the full length of the reference edge 118 and thus use the image 160 to locate reference features for use in determining the position of the mobile device 12.

The processor 40 may be configured to decode modulated signal portions of VLC signals to identify the lights and determine the spatial locations of the reference points of the lights. The processor 40 may be configured to determine a spatial location of a reference feature in response to a determination that an image is of a modulated light signal. The processor 40 may analyze multiple images of a light, e.g., the light 75, and decode the codeword from the modulated signals 104. The processor 40 may analyze the images to determine widths of the dark stripes, e.g., the stripes 134, 136, to determine individual symbol values and determine the sequence of the symbol values in order to determine the codeword. The processor 40 may determine spatial locations of the reference features of the light 75 by accessing relationships between the light identity and the spatial locations of the reference features. For example, the processor 40 may access a look-up table and/or a map stored in the memory 42 that contains identities of the lights 71-78 and spatial locations (e.g., relative to a reference axis, such as a center of the Earth, a corner of the floor 70, a corner of the building 22, etc.) of the reference features 114, 116. The look-up table and/or the map may be stored in the memory 42 in response to the mobile device 12 entering the building 22, e.g., an access point of the building 22 providing the look-up table and/or the map in response to detecting the new presence of the mobile device 12 or in response to the mobile device 12 requesting the look-up table and/or the map. Downloading of the look-up table and/or the map may be triggered automatically by the processor 40 in response to the mobile device 12 determining that the mobile device 12 has entered an indoor venue. For example, the processor 40 may determine that the mobile device 12 has entered an indoor venue using contextual information or by employing a positioning system that uses a combination of satellite positioning system (SPS) and terrestrial radio frequency (RF) technologies. The look-up table and/or the map may be downloaded to the mobile device 12, e.g., using an out-of-band (RF) signal from a wireless local area network (WLAN), a wide area network (WAN), or other network.

The processor 40 may be configured to determine the position of the mobile device 12 using the image locations and spatial locations of the reference features and, optionally, the orientation(s) of the mobile device 12 when the image(s) of the reference features was captured. The processor 40 may determine angles of lines connecting the spatial locations (e.g., three-dimensional coordinates relative to a reference axis of the building 22) of the reference features and the camera 48 using the image locations of the reference features, and optionally using the orientation of the mobile device 12. The processor 40 may use the spatial locations of the reference points to find an intersection of these lines relative to one or more of the reference features and/or the reference axis, and use this intersection as the position of the mobile device 12. One or more of the calculations to determine the position of the mobile device 12 may be performed outside of the processor 40, e.g., by the processor 60 of the server 18.

Figure 13:
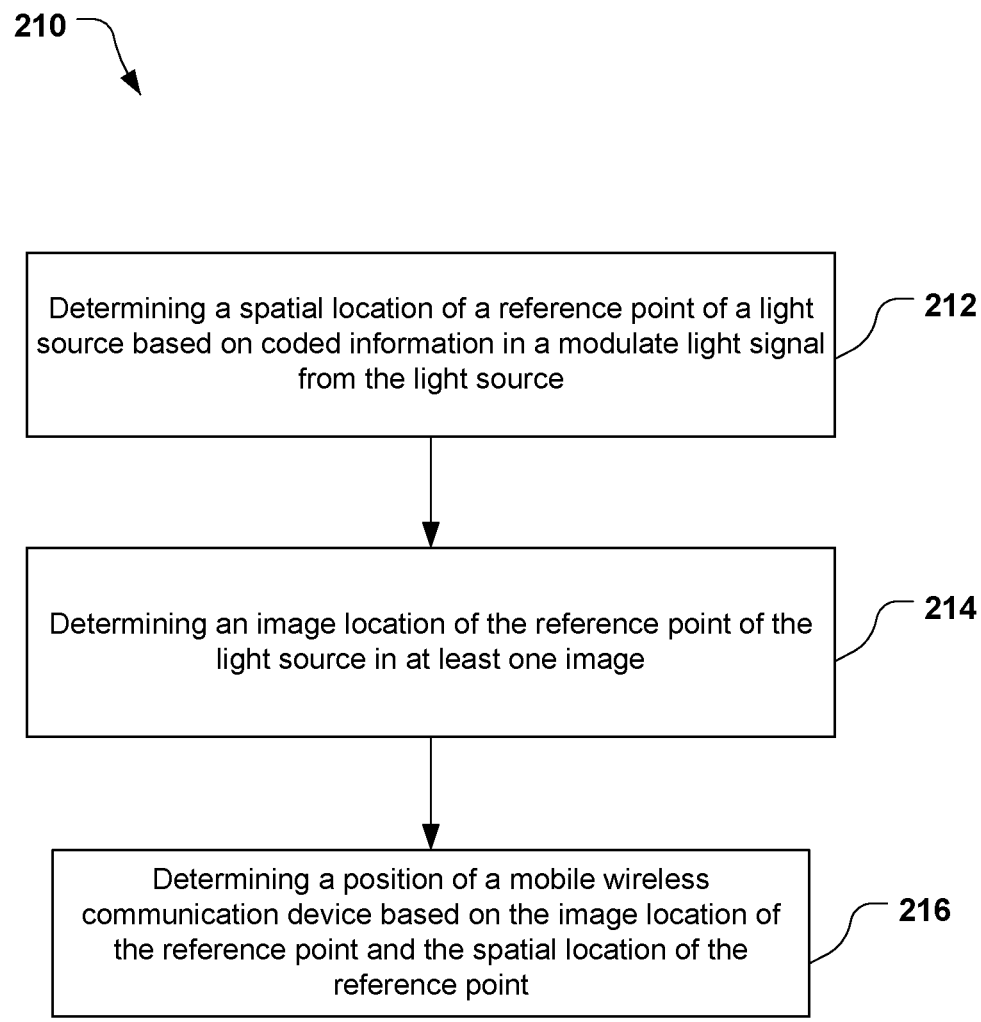
FIG. 13 is a block flow diagram of a method of determining data of a fingerprint map.

Referring to FIG. 13, with further reference to FIGS. 1-12, a method 210 of determining a position of a mobile wireless communication device includes the stages shown. The method 210 is, however, an example only and not limiting. The method 210 can be altered, e.g., by having stages added, removed, rearranged, combined, performed concurrently, and/or having single stages split into multiple stages.

At stage 212, the method 210 includes determining a spatial location of a reference point of a light source based on coded information in a modulated light signal from the light source. For example, the processor 40 may analyze one or more images such as the images 130, 150 to determine an identity of the light 75 and look up the spatial location of the corner (e.g., reference feature 114) in an association (e.g., a look-up table and/or a map) of identities of light sources with spatial locations of corresponding reference points. The coded information in not necessarily, and likely not, encrypted information, but coded in the sense of different signal characteristics corresponding to different symbol values. Determining the spatial location may be in response to a determination that at least one first image is of the modulated light signal from the light source, and the method 210 may further include making this determination. For example, images may be captured, including the at least one first image, and the determination that at least one first image is of the modulated light signal from the light source may be made by analyzing each of the images for a detectable stripe within regions of the images corresponding to the light source.

At stage 214, the method 210 includes determining an image location of the reference point of the light source in at least one image. For example, the processor 40 may analyze one or more images such as the image 110 to determine a location in the image 110 of the corner (i.e., reference feature 114). The at least one image may be at least one second image and determining the image location may be in response to a determination that the at least one second image is of an unmodulated light signal from the light source, and the method 210 may further include making this determination. For example, the processor 40 may analyze multiple images and identify, as the at least one second image, each of the multiple images in which the light source is without a detectable stripe within a region of light corresponding to the light source. Also or alternatively, determining the image location of the reference point may comprise analyzing only the at least one second image. For example, the processor 40 may only analyze one or more images of a light source that the processor determines shows an unmodulated signal from the light source in order to determine a location of the reference point in the image.

At stage 216, the method 210 includes determining a position of a mobile wireless communication device based on the image location of the reference point and the spatial location of the reference point. For example, the processor 40 may determine the position of the mobile device 12 using the spatial location of the reference point (e.g., relative to a reference axis origin of a building) and the image location of the reference point (e.g., the location of the reference point in the image captured by the camera 48, such as a location on the display 50 of the reference point). Determining the position of the mobile wireless communication device may further be based on an orientation of the mobile wireless communication device. For example, the processor 40 may use the orientation of the mobile device, e.g., as indicated by the sensors 52, and the image locations to determine angles of spatial lines from multiple reference points to the camera 48. The processor 40 may use the spatial locations of the reference points to determine a spatial intersection of these lines and determine the position of the mobile device 12 as the spatial intersection of the lines.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, more than one invention may be disclosed.

What is claimed is:

1. A mobile wireless communication device comprising:
   memory; and
   a processor, communicatively coupled to the memory and configured to:
   in response to a determination that at least one first image of a plurality of images stored in the memory is of a modulated light signal transmitted by a light source and comprising coded information, determine a spatial location of a reference point of the light source based on the coded information;
   in response to a determination that at least one second image of the plurality of images is of an unmodulated light signal emanating from the light source, determine an image location of the reference point of the light source in the at least one second image; and
   determine a position of the mobile wireless communication device based on the image location of the reference point and the spatial location of the reference point;
   wherein the processor is configured to analyze each of the plurality of images for a detectable stripe within a region corresponding to the light source to make the determination that the at least one first image is of the modulated light signal and the determination that the at least one second image is of the unmodulated light signal, wherein the detectable stripe is indicative of a change in amplitude of the modulated light signal.

2. The device of claim 1, further comprising a camera comprising a rolling shutter and configured to capture the plurality of images, wherein the processor is configured to identify, as the at least one second image, each of the plurality of images in which the light source is without the detectable stripe across the light source.

3. The device of claim 1, wherein to determine the spatial location of the reference point the processor is configured to:
determine an identity of the light source based on the coded information; and
find the spatial location of the reference point based on the identity of the light source and an association of the identity of the light source and the spatial location of the reference point.

4. The device of claim 1, wherein the processor is configured to determine the image location of the reference point by analyzing only the at least one second image.

5. The device of claim 1, wherein the processor is configured to determine the position of the mobile wireless communication device further based, at least in part, on an orientation of the mobile wireless communication device.

6. A method comprising:
determining a spatial location of a reference point of a light source based on coded information in a modulated light signal from the light source in response to a determination that at least one first image is of the modulated light signal from the light source;
determining an image location of the reference point of the light source in at least one second image in response to a determination that the at least one second image is of an unmodulated light signal from the light source;
determining a position of a mobile wireless communication device based on the image location of the reference point and the spatial location of the reference point;
capturing a plurality of images including the at least one first image and the at least one second image; and
making the determination that the at least one first image is of the modulated light signal from the light source and the determination that the at least one second image is of the unmodulated light signal from the light source by analyzing each of the plurality of images for a detectable stripe within regions of the plurality of images corresponding to the light source, wherein the detectable stripe is indicative of a change in amplitude of the modulated light signal.

7. The method of claim 6, wherein making the determination that the at least one second image is of the unmodulated light signal from the light source comprises identifying, as the at least one second image, each of the plurality of images in which the light source is without the detectable stripe within a region of light corresponding to the light source.

8. The method of claim 6, wherein determining the spatial location of the reference point comprises:
determining an identity of the light source from the coded information; and
finding the spatial location of the reference point based on the identity of the light source and an association of the identity of the light source and the spatial location of the reference point.

9. The method of claim 6, wherein determining the image location of the reference point comprises analyzing only the at least one second image.

10. The method of claim 6, wherein determining the position of the mobile wireless communication device is further based on an orientation of the mobile wireless communication device.

11. A mobile wireless communication device comprising:
means for capturing a plurality of images;
means for storing the plurality of images;
means for determining a spatial location of a reference point of a light source based on coded information in a modulated light signal from the light source in response to a determination by means for making a determination that at least one first image, of the plurality of images, is of the modulated light signal from the light source;
means for determining an image location of the reference point of the light source in at least one second image, of the plurality of images, in response to a determination by means for making a determination that the at least one second image is of an unmodulated light signal from the light source; and
means for determining a position of the mobile wireless communication device based on the image location of the reference point and the spatial location of the reference point;
wherein the means for making the determination that the at least one first image is of the modulated light signal from the light source and the means for making the determination that the at least one second image is of the unmodulated light signal from the light source comprise means for analyzing each of the plurality of images for a detectable stripe within regions of the plurality of images corresponding to the light source, wherein the detectable stripe is indicative of a change in amplitude of the modulated light signal.

12. The device of claim 11, wherein the means for making the determination that the at least one second image is of the unmodulated light signal from the light source comprise means for identifying, as the at least one second image, each of the plurality of images in which the light source is without the detectable stripe within a region of light corresponding to the light source.

13. The device of claim 11, wherein the means for determining the spatial location of the reference point comprise means for determining an identity of the light source from the coded information, and are for finding the spatial location of the reference point based on the identity of the light source and an association of the identity of the light source and the spatial location of the reference point.

14. The device of claim 11, wherein the means for determining the image location of the reference point are configured to analyze only the at least one second image of the plurality of images.

15. The device of claim 11, wherein the means for determining the position of the mobile wireless communication device are for determining the position of the mobile wireless communication device further based on an orientation of the mobile wireless communication device.

16. A non-transitory, processor-readable storage medium storing processor-readable instructions configured to cause a processor to:
determine a spatial location of a reference point of a light source based on coded information in a modulated light signal from the light source in response to a determination that at least one first image is of the modulated light signal from the light source;
determine an image location of the reference point of the light source in at least one second image in response to a determination that the at least one second image is of an unmodulated light signal from a region of the modulated light signal;

determine a position of a mobile wireless communication device based on the image location of the reference point and the spatial location of the reference point; and analyze each of a plurality of images for a detectable stripe within a region corresponding to the light source to make the determination that the at least one first image is of the modulated light signal from the light source and the determination that the at least one second image is of the unmodulated light signal from the light source, wherein the detectable stripe is indicative of a change in amplitude of the modulated light signal.

17. The storage medium of claim 16, wherein the instructions configured to cause the processor to make the determination that the at least one second image is of the unmodulated light signal from the light source comprise instructions configured to cause the processor to identify, as the at least one second image, each of the plurality of images in which the light source is without the detectable stripe within a region of light corresponding to the light source.

18. The storage medium of claim 16, wherein the instructions configured to cause the processor to determine the location of the light source comprise instructions configured to cause the processor to:

determine an identity of the light source from the coded information; and find the spatial location of the reference point based on the identity of the light source and an association of the identity of the light source and the spatial location of the reference point.

19. The storage medium of claim 16, wherein the instructions configured to cause the processor to determine the image location of the reference point are configured to cause the processor to analyze only the at least one second image.

20. The storage medium of claim 16, wherein the instructions configured to cause the processor to determine the position of the mobile wireless communication device are configured to cause the processor to determine the position of the mobile wireless communication device further based on an orientation of the mobile wireless communication device.

21. The device of claim 1, wherein the processor is configured to:

determine an orientation mobile wireless communication device relative to the light source; and determine the position of the mobile wireless communication device based at least in part on the orientation of the wireless communication device relative to the light source.

22. The device of claim 1, wherein the reference point comprises an edge or corner disposed at a known location on the light source.

* * * * *